Figure 1:
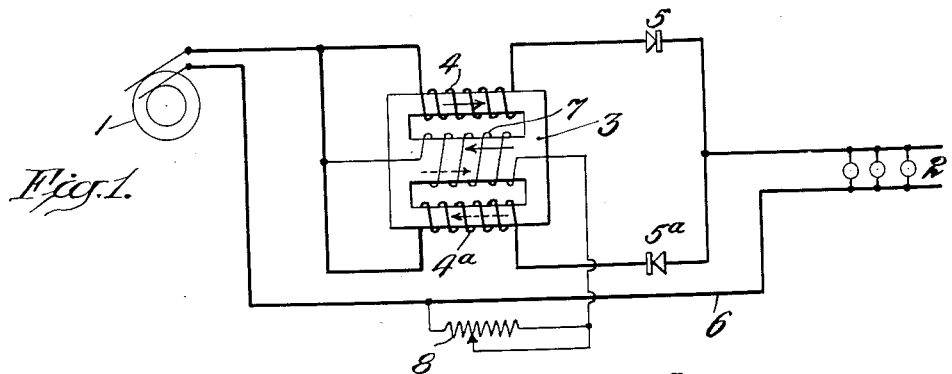

Oct. 21, 1941.   F. G. LOGAN   2,259,647
ELECTRIC CONTROLLING APPARATUS
Filed Feb. 9, 1939   3 Sheets-Sheet 1

INVENTOR
FRANK G. LOGAN
BY
Lawrence K. Sager
his ATTORNEY

Oct. 21, 1941.                F. G. LOGAN                2,259,647
                    ELECTRIC CONTROLLING APPARATUS
                    Filed Feb. 9, 1939          3 Sheets-Sheet 2

INVENTOR
FRANK G. LOGAN
BY
Lawrence K. Sager
his ATTORNEY

Oct. 21, 1941.　　　　F. G. LOGAN　　　　2,259,647
ELECTRIC CONTROLLING APPARATUS
Filed Feb. 9, 1939　　　3 Sheets-Sheet 3
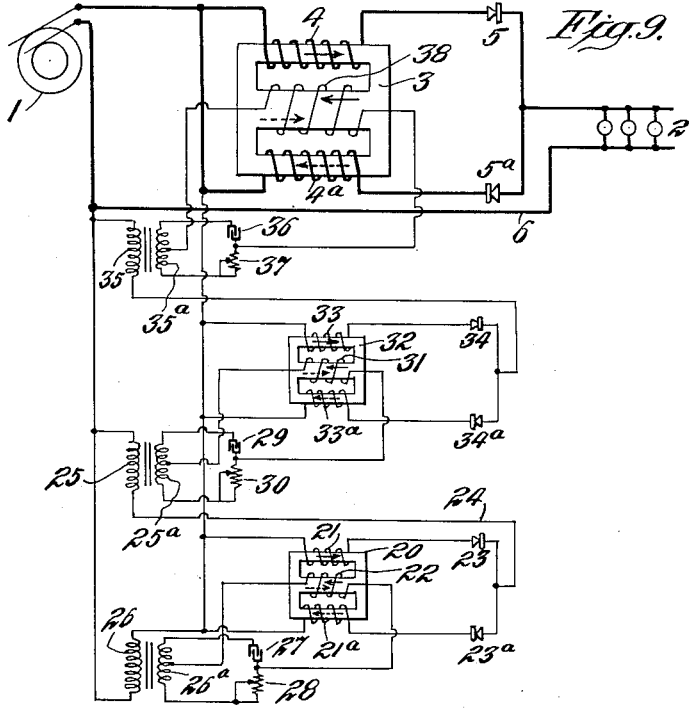
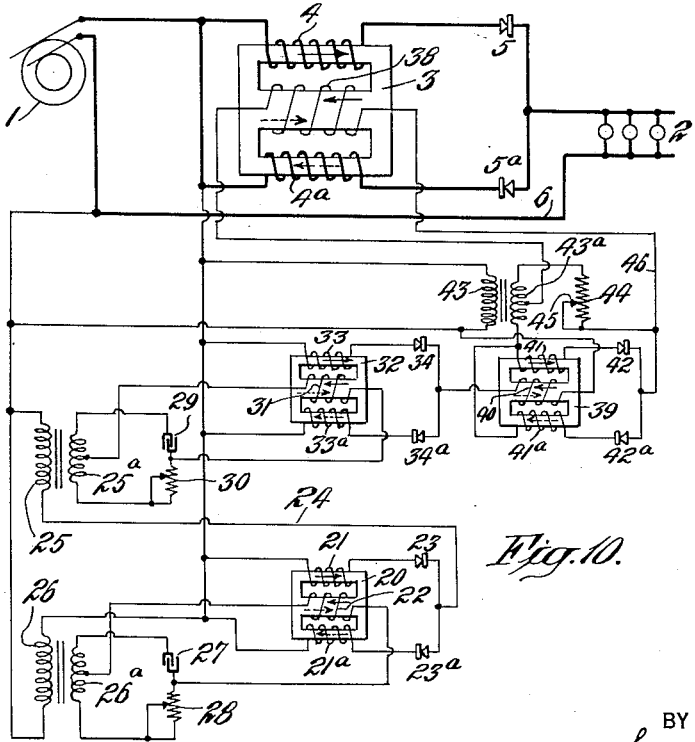
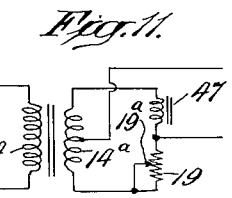
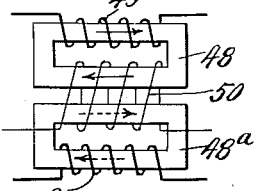
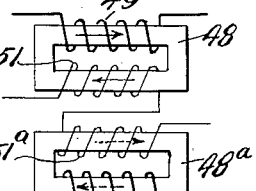
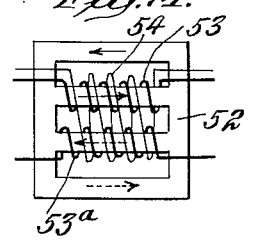
INVENTOR
FRANK G. LOGAN
BY
Lawrence K. Sager
his ATTORNEY Patented Oct. 21, 1941

2,259,647

UNITED STATES PATENT OFFICE 2,259,647

ELECTRIC CONTROLLING APPARATUS

Frank G. Logan, Mount Vernon, N. Y., assignor to Ward Leonard Electric Company, a corporation of New York Application February 9, 1939, Serial No. 255,393

10 Claims. (Cl. 171—242)

This invention relates to the control of power supplied to a consumption circuit by change of the voltage applied to the consumption circuit and particularly relates to an improved method and means for controlling the voltage and current over a wide range. This improvement secures such control by the use of a small amount of controlling current with reference to the amount of power controlled thereby. It is desirable for the control of lamp circuits and for change of lighting effects and a graduated control thereof. It is also applicable to various other purposes, such as the control of motors and other translating devices where it is desired to vary the voltage or current of a translating device, either by a graduated refined control or by more abrupt changes.

In United States patent granted August 16, 1938, #2,126,790 is disclosed a method and apparatus for securing such form of control by the use of a reactor supplied from an alternating current source and wherein the load current windings of the reactor are subjected to intermittent currents in the same direction, as regards each of the load current windings, although the current supplied to the consumption circuit is an alternating current. The flux in the reactor core developed by the load current windings are so related as to permit the use of a direct current in the control winding with very advantageous results compared with that obtainable in prior types of reactors; and in another form the flux of the load current windings develops induced alternating current in the control winding.

The present improvement is based upon the disclosures of my prior patent but instead of using a direct current or an induced current in the control winding, an alternating current is supplied thereto having the same frequency, or a properly related frequency, as that of the source whose power is to be controlled; and the change of flux due to the control winding is so related to the flux produced by the load current windings of the reactor as to secure the desired control. This may be accomplished in various ways according to the particular requirements. The following description and accompanying drawings disclose various embodiments of this invention adapted for various uses according to the particular requirements and it will be understood by those skilled in the art that the invention may be embodied in various other forms for special purposes.

One object of the invention is to provide an improved method and apparatus for securing a wide range of control of the energy supplied to the translating device by means of the use of a small amount of control energy compared with the energy of the power circuit controlled thereby. Another object is to secure such control by an improved method and simple and inexpensive form of controlling apparatus. Another object is to provide apparatus which will be economical in operation and occupy a comparatively small amount of space. Another object is to provide improved apparatus which will be durable and dependable in operation under long continued use. Other objects and advantages will be understood from the following description and accompanying drawings.

Fig. 1 is a diagram showing one embodiment of the invention and Figs. 2 to 14 are diagrams showing various modifications and adaptations of the invention for various requirements.

Referring to Fig. 1, the source of power is shown as an alternating current source I which supplies energy to the load 2 which may be of any character. A three-legged reactor having a core 3 is shown for purpose of illustration, although it may be of other form. The upper leg of the core is shown having a load winding 4 connected to one side of the source and in series with an electric valve or rectifier 5 from which a connection leads to one line of the load circuit. The lower leg of the core carries another load winding 4a which is connected to the same side of the source as the winding 4 and is in series with another electric valve or rectifier 5a which in turn is connected to the same line of the consumption circuit as the rectifier 5. The other line of the load circuit is connected by the wire 6 to the other side of the source. The rectifiers 5 and 5a are reversed with reference to each other in the supply circuit, the rectifier 5 permitting half-wave currents to pass in the consumption circuit in one direction when the upper side of the source I to which it is connected is say positive, but when the upper terminal of the source becomes negative and the lower terminal positive, then the rectifier 5a will permit passage of current during the other half-waves in a reverse direction through the consumption circuit. This action takes place on account of the reversed relation of the two rectifiers in one of the supply lines and results in supplying an alternating current to the load circuit. Consequently the load winding 4 of the reactor is subjected to intermittent half-wave currents in one direction and the load winding 4a is subjected to intermittent half-wave currents in the reverse direction.

The relative direction of turns of the windings 4 and 4a on the reactor is such as to cause an alternating flux to pass through the middle leg of the core during each full wave cycle of the source 1. It may be assumed that the full arrow on the upper leg of the core represents the direction of the flux created by the winding 4 during each half cycle. This flux finds a return path through the middle leg of the core in the direction indicated by the full line arrow on the middle leg. Under this assumption of direction of flux due to the winding 4, the direction of the flux in the lower leg of the core due to the winding 4a is made as indicated by the dotted line arrow on the lower leg and this flux finds a return path through the middle leg of the core in the direction indicated by the dotted arrow on the middle leg. Thus it is apparent that the flux in the middle leg of the core is reversed in direction during each full wave, the winding 4 causing the flux to pass in one direction in the middle leg during alternate half-waves and the winding 4a causing the flux to pass through the middle leg in the reverse direction during intervening half waves.

The middle leg of the reactor carries a control winding 7 which is supplied with an alternating current. This control winding is subjected to a current of the same frequency as the source 1 and has one terminal connected to one side of the source 1 and the other terminal is connected to the other side of the source through an adjustable resistance 8. The direction of the turns of the winding 7 on the middle leg of the reactor is such that during the half-wave periods when the load winding 4 is inactive, the flux due to the control winding 7 will be in a direction opposite to that due to the winding 4 and bias the magnetization of the iron of the upper leg and that of the path of the flux of winding 4 at a lower point on the magnetization curve than when winding 4 was active; and it follows under these conditions that during the alternate half-waves when the load winding 4a is inactive, the flux due to the control winding 7 will be in a direction opposite to the flux due to the load winding 4a and bias the magnetization of the iron of the lower leg and that of the path of the flux of winding 4a at a lower point on the magnetization curve than when winding 4a was active. That is, during the half-wave periods when the load winding 4 is inactive the direction of flux due to the winding 7 will be opposite to that indicated by the full line arrows, whereas during the alternate half periods when the winding 4a is inactive the direction of flux due to the winding 7 will be opposite to that represented by the dotted line arrows.

In operation, let it first be assumed that no current is supplied to the control winding. In that case, the voltage and current supplied to the load 2 will be determined by the impedance of the load windings 4 and 4a, the voltage supplied to the load being less than that of the source; and the impedance of the load windings is made such as to give the maximum voltage desired to be applied to the load circuit.

Now assume that the circuit through the control winding is closed with a maximum amount of resistance 8 inserted in series with the control winding so that a small amount of current is permitted to pass through the control winding. This will increase the reactance of the windings 4 and 4a and reduce the voltage applied to the load. This action may be understood by first considering the effect of the control winding when the load winding 4 is inactive. The direction of flux due to the control winding 7 during such half-waves is opposite to the full line arrows, as already explained. This consequently biases the iron core of winding 4 by moving the residual point of magnetization of the iron down on the magnetization curve some distance during each half-wave when winding 4 is inactive. This increases the reactance of the winding 4 because it now has to overcome the lowered core magnetization each time it becomes active. Similarly during the half periods when the load winding 4a is inactive, the current in the winding 7 is repositioning the residual point of the magnetization in its portion of the core at a lower value. It results that the reactance of the winding 4a is thereby increased. Consequently the increased reactance of the load windings due to the passage of a small current in the control winding during the respective inactive periods of the load windings causes a reduction of voltage applied to the load circuit.

Now assume that the resistance 8 is adjusted to decrease the amount of resistance in series with the control winding and thereby increase the current supplied to the control winding. This further increases the reactance of the windings 4 and 4a because during their inactive periods the residual points are moved down still further on the magnetization curve resulting in a still lower voltage being applied to the load circuit. A further increase of current in the control winding similarly results in a further reduction of the voltage applied to the load circuit and in this manner the voltage may be reduced to a low value. When the amount of resistance 8 in circuit is gradually increased to reduce the current in the control winding, the voltage applied to the load circuit will be increased gradually toward a maximum value. Thus a wide range of control is secured by use of a comparatively small amount of controlling current in the control winding and by refined and smooth graduations of control as determined by the graduations of the resistance steps.

A characteristic of this control is that control is achieved in full during each cycle and that when the controlling current in winding 7 is changed, full response to this change is reached not longer than one cycle later. As the controlling potential is alternating, its current is capable of substantially instantaneous change. In order that the control winding 7 may have current passed through it to produce this bucking effect with reference to the flux due to the load windings, the voltage applied to the control winding must be sufficient to overcome the induced voltage in the control winding due to the flux of the load windings.

Figure 2:
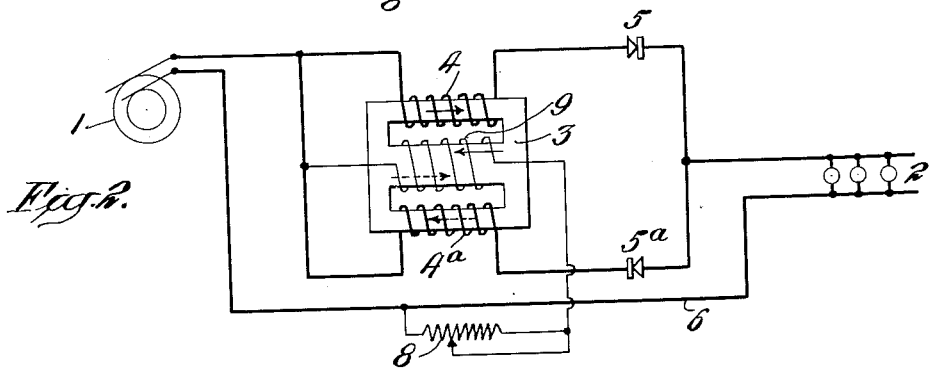

Fig. 2 is similar to Fig. 1 except the control winding 9 of Fig. 2 is reversed in its direction of turns with reference to that above described in Fig. 1. This results in the control winding 9 raising the residual point on the magnetization curve by an aiding effect instead of a bucking effect in lowering this point as described with reference to Fig. 1 during each half-wave. Let it be assumed first that the circuit of the control winding 9 is open and has no effect. In that case the voltage applied to the load circuit will have its minimum value and this value may be determined by proportioning the core of the reactor and the load windings to give the desired minimum volts to the load circuit. Now assume that the resistance 8 is adjusted to pass a small current through the control winding 9. As this winding is reversed with reference to the winding 7 previously considered, it will be seen that the direction of flux due to the current in the winding 9 through the load windings when the latter are inactive is in the same direction as that of the flux due to the load windings respectively when they are active. For example, with the flux due to the load winding 4 being represented by the full line arrow during its active half-wave periods, the flux due to the winding 9 will be in the same direction through the core of winding 4 during the periods when winding 4 is inactive and therefore it results that the effect of the winding 9 is to raise and further bias the magnetization of the core toward saturation. Similarly when the load winding 4a is inactive, the flux due to the winding 9 will be in the same direction through the core of winding 4a as occurs when winding 4a is active and thereby raise the magnetization of the core of winding 4a. This increase of magnetization by the aiding effect of the control winding 9 during each half-wave results in decreasing the reactance of the load windings and thereby increases the voltage applied to the load circuit. Similarly a further increase of current in the control winding 9 will raise the magnetization of the cores of windings 4 and 4a further toward saturation and give a further increase in the voltage applied to the load circuit; and this action continues as the current in the control winding 9 is increased until the core of the reactor has become so fully saturated that the reactance of the load windings is so much reduced that the power of the load circuit is brought to its maximum amount. In this case the voltage applied to the control winding 9 acts with the voltage induced in this winding. Decreasing the current in the control winding 9 will gradually reduce the voltage applied to the load circuit to the minimum voltage attainable in this form of apparatus.

Figure 3:
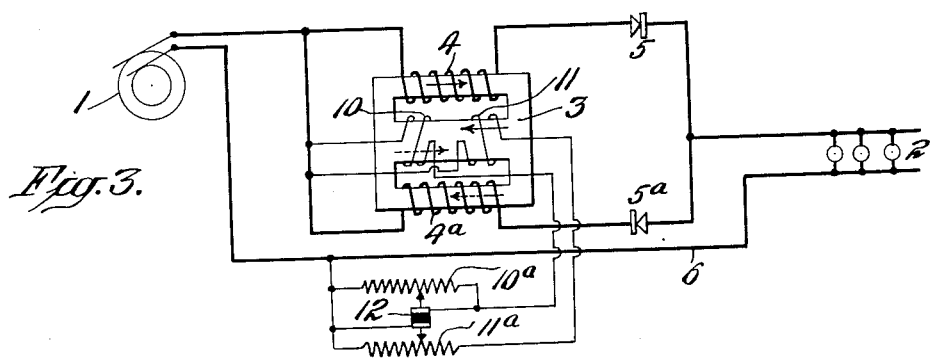

In Fig. 3 both the bucking and the saturating action described with reference to Figs. 1 and 2 are combined so as to secure control from an intermediate condition in both directions above and below it. In Fig. 3 there are two control windings 10 and 11 on the middle leg of the core, the winding 10 in its direction and effect corresponding to the winding 7 of Fig. 1 and the winding 11 corresponding in its direction and effect to the winding 9 of Fig. 2. The winding 10 is connected in series with an adjustable resistance 10a across the source 1 while the winding 11 is connected in series with an adjustable resistance 11a across the source. The adjustment of these resistances is secured by a movable element 12 upon which the adjustable contacts of the resistances are mounted and insulated from each other and arranged so that movement of the element 12 to the left will cause increase of the resistance 11a in the circuit of its winding and decrease of the resistance 10a in its circuit while movement to the right will have the reverse effect.

When the element 12 is in its mid-position the current in the two control windings 10 and 11 will be of approximately the same value and by tapering the resistors properly, sufficient resistance will be in each circuit to limit the effect of the windings to a negligible value. It follows that the voltage applied to the load circuit will then have a value determined by the proportions of the core and of the load windings and this value of voltage will be an intermediate value lower than the maximum and higher than the minimum value of voltage obtainable by this form of construction. Now assume that the element 12 is moved from its mid-position to the left. This will gradually increase the current in the bucking winding 10 and gradually decrease the current in the cumulative winding 11. This secures a gradually increasing bucking effect and gradually reduces the voltage applied to the load circuit in the manner explained with reference to Fig. 1. On the other hand when the element 12 is moved from its mid-position to the right, the current in the cumulative or aiding winding 11 gradually increases while that in the bucking winding 10 gradually decreases giving a resultant cumulative effect and causing the magnetization of the core to approach and arrive at a saturated condition. This, of course, gradually increases the voltage applied to the load circuit to a maximum amount in the manner explained with reference to Fig. 2. Thus by the form of apparatus indicated by Fig. 3, a wide range of control is secured from an intermediate value up to a high maximum value and also from the intermediate value down to a low minimum.

Figure 4:
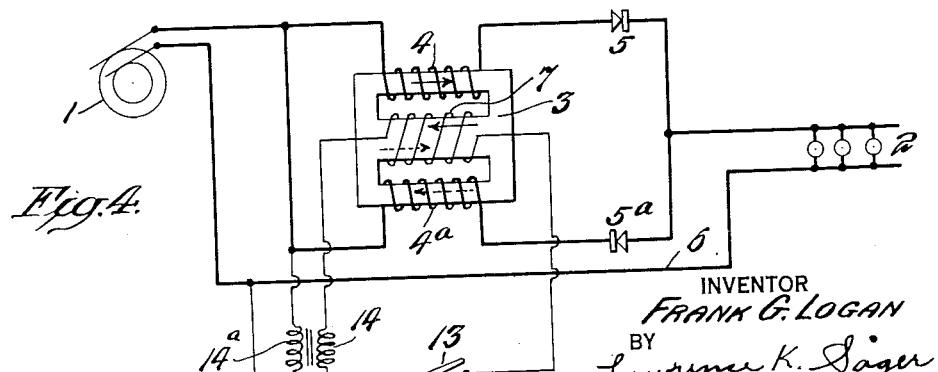

Fig. 4 is similar to Fig. 1 except the bucking winding 7 is controlled by a switch 13 for closing or opening the circuit of the control winding. In this case the current supplied to the control winding is derived from the secondary 14 of a transformer, the primary 14a of which is connected across the source 1. When the switch 13 is open, no current flows in the control winding and the voltage applied to the load will be that determined by the design of the reactor core and load windings. When the switch 13 is in closed position the current passing through the control winding will cause a bucking effect and biasing of the iron at a lower value in the manner described with reference to Fig. 1 and reduce the voltage applied to the load to an amount determined by the value of the current passed through the control winding in the closed position of the switch. By this form of construction the voltage applied to the load may have one value when the switch 13 is open and a lower value when the switch 13 is closed which lower value may be made any amount desired as determined by the design of the transformer 14, 14a or by the amount of resistance in the circuit of the control winding.

Figure 5:
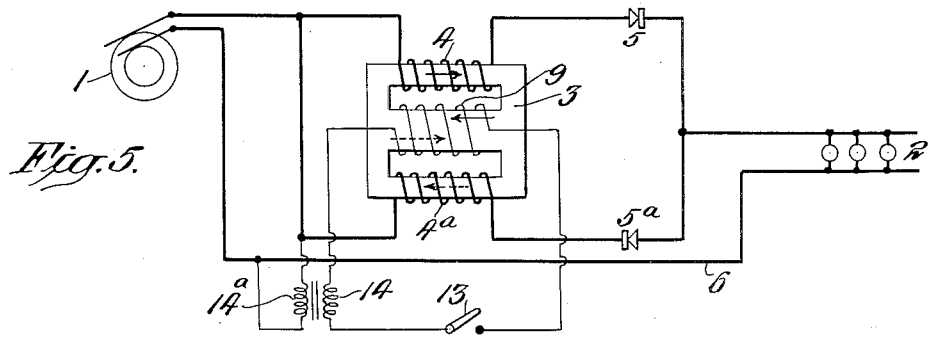

Fig. 5 is similar to Fig. 4 except the control winding is reversed and is a cumulatively acting winding 9 to bias the iron at a higher value like that of Fig. 2. In this case the closing of the switch 13 will cause the voltage applied to the load circuit to be increased from a value determined by the design of the reactor to a certain higher value determined by the amount of current passed through the control winding by the closing of the switch. Thus two different voltages may be applied to the load by the opening and closing of the switch. In the forms of Figs. 4 and 5 and also of Fig. 6 the change accomplished by the control is very rapid, not requiring more than one cycle with a resistive load after the switch contacts close.

Figure 6:
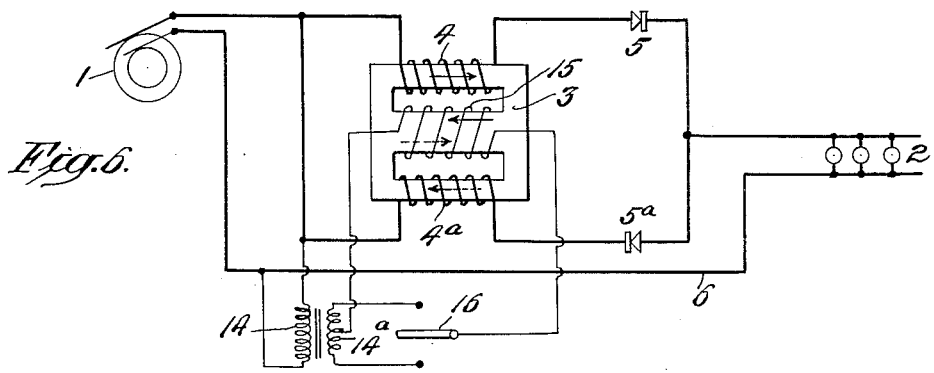

Fig. 6 is based upon Figs. 4 and 5 and secures the combined effect of both figures. In Fig. 6 the control winding 15 is connected to a switch 16 adapted to engage either of the terminals of the secondary winding 14a. The other terminal of the control winding is connected to a tap of the secondary winding 14a. When the switch 16 is in its open position the voltage applied to the load circuit will be that dependent upon the design of the reactor because no current passes through the control winding 15. When the switch 16 is thrown to engage one terminal of the secondary winding 14a the control current will pass through the winding 15 so as to have a bucking effect and thereby reduce the voltage applied to the load and when the switch is thrown to engage the other terminal of the secondary winding, the control current will have a cumulative effect and raise the voltage applied to the load to a certain maximum amount. The tap of the transformer 14a may be adjusted to secure the required relative bucking and cumulative effects in the control winding when the switch is closed in its two different positions. This apparatus therefore enables three different voltages to be applied to the load circuit, that is, a desired intermediate voltage, a desired higher voltage and a desired lower voltage according to the position of the switch.

Figure 7:
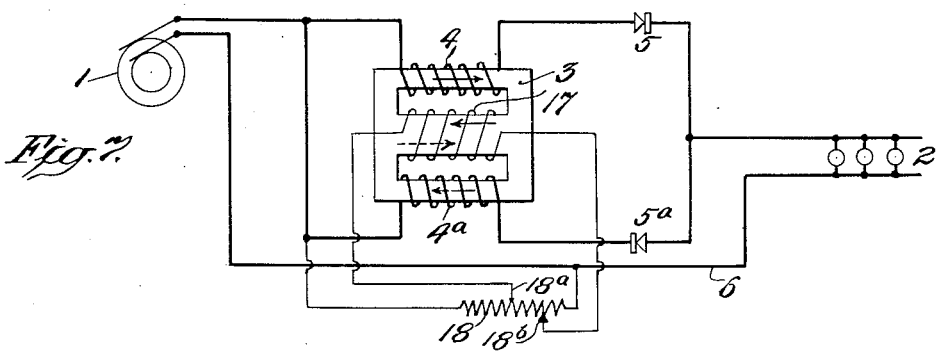

Fig. 7 shows another embodiment of the invention wherein the control winding 17 may be subjected not only to a change in value of the controlling current but also to a shifting of the phase of the controlling current. In this case an adjustable resistance 18 is connected across the source and a tap 18a from an intermediate portion of the resistance is connected to one terminal of the control winding 17 while the other terminal thereof is connected to the movable resistance contact 18b. When the contact 18b concides with the tap 18a, no current from the source 1 will be supplied to the control winding 17 and the voltage applied to the load will be an intermediate voltage determined by the characteristics of the reactor. When the contact 18b is moved to the right, the current supplied to the control winding from the source will be gradually increased and it may be assumed that the effect of such current will be cumulative or aiding as regards biasing the magnetization of the core 3 and thereby gradually raise the voltage of the load circuit from an intermediate value to a maximum value. When the movable contact is moved to the left of the tap 18a, the current supplied to the control winding from the source 1 will have a reverse or bucking effect and bias the iron at a lower value and thereby gradually lower the voltage of the load circuit from an intermediate value to a minimum. When the contact 18b is shifted from its extreme right-hand position to the extreme left-hand position, a wide range of control is obtained from a maximum above an intermediate value to a minimum below the intermediate value.

Figure 8:
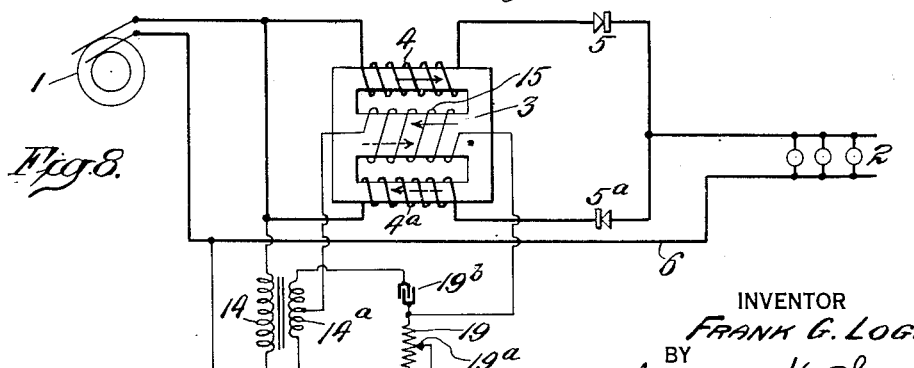

Fig. 8 is similar to Fig. 6 except that means are provided to secure a graduated control above and below an intermediate value instead of a three-position control. In Fig. 8 the leads from the terminals of the secondary winding 14a are connected to a capacitive device 19b and to an adjustable non-inductive resistive device 19 in series with each other; and from the point of connection between these devices a lead extends to one terminal of the control winding 15, the other terminal of which is connected to an intermediate tap of the secondary transformer winding 14a. When the contact 19a of the adjustable resistance is in the extreme lower position, the phase of the current in the control winding may be assumed such as to give a maximum aiding biasing effect to the flux of the reactor core and thereby raise the voltage applied to the load to a maximum value. When the contact 19a is gradually shifted from its lower position to its upper position, the phase of the current in the control winding is gradually shifted and thereby gradually reduces its aiding effect and then, as the phase of the control current is further shifted, it serves to give a gradually increasing bucking biasing effect on the flux of the reactor core until, when the contact 19a is in its upper position, the phase of the current in the control winding is such as to give a sufficient bucking effect to reduce the voltage applied to the load circuit to a desired minimum. That is to say, the shifting of the contact 19a from one extreme position to the other results in the phase of the current in the control winding being shifted gradually through something less than 180° and from a condition of maximum aiding effect on the flux of the core to a position of maximum bucking effect on the flux of the core, giving a wide range of voltage applied to the load circuit.

Instead of using a single reactor for controlling the load voltage and current, the controlling effect may be greatly increased by the cascading of a number of these reactor controls and thereby greatly increase the range of control and the amount of power capable of being controlled.

In Fig. 9 three stages of control are illustrated. The alternating current source 1 is shown as supplying current to the windings 4 and 4a through the reversed rectifiers 5 and 5a to the load 2 and indicates the main load power reactor and load controlled thereby. At the lower portion of Fig. 9 is indicated a reactor having a core 20 with windings 21 and 21a on its outer legs and a control winding 22 on its middle leg. The reactor winding 2 and 21a are connected to one side of the source 1 and their remaining terminals are connected respectively through reversed rectifiers 23 and 25a to a lead 24 which is connected to one terminal of a primary winding 25 of a transformer, the other terminal of which is connected to the other side of the source 1. The source of current for the control winding 22 of this reactor is derived from a transformer having a primary winding 26 connected across the source 1 and a secondary winding 26a which has its terminals connected to a capacitive device 27 and a non-inductive adjustable resistive device 28 which are connected in series with each other. From a point between the capacitive device 27 and the resistive device 28 a connection leads to one terminal of the control winding, the other terminal of which is connected to an intermediate tap of the secondary winding 26a. The operation of this stage of the apparatus of Fig. 9 is similar to that already described with reference to Fig. 8, giving a wide range of control of the output of the reactor which is delivered to the transformer winding 25.

In the next stage of control the secondary winding 25a of the transformer having the primary winding 25 is connected to a capacitive device 29 which is connected in series with an adjustable non-inductive resistive device 30. From a point in the connection between the devices 29 and 30 a connection extends to the control winding 31 of the reactor 32, the other terminal of the control winding being connected to an intermediate tap of the secondary winding 25a. The main windings 33, 33a on the outer legs of this reactor have their terminals connected to one side of the source 1, the remaining terminals being connected respectively through reversed rectifiers 34, 34a to one terminal of a primary winding 35 of a transformer, the other terminal of which is connected to the other side of the source 1. The adjustment of the resistance 30 of this stage is for the purpose of securing a proper phase of the current with respect to the induced voltage in the control winding 31 for securing a desired controlling effect and after once being adjusted may remain a permanent adjustment. The variation in control is secured by the movement of the adjustable contact of the resistance 28, as already explained.

In this second stage of control the maximum output capable of being delivered therefrom is greatly amplified compared with the maximum power capable of being delivered from the first stage.

The third stage of control is obtained in a similar manner, the secondary winding 35a supplying a capacitive device 36 and a non-inductive resistive device 37 connected in series with each other. From a point between these devices a connection extends to one terminal of the control winding 38 of the main reactor, the other terminal being connected to an intermediate tap of the secondary winding 35a. It will be understood that the greatly amplified control of power to which the transformer primary 35 is subjected by the second stage is still further increased in the third stage which is represented by the power reactor which supplies the load circuit. The adjustment of the resistance 37 is for the purpose of adjusting the phase of the current in the control winding 38 for securing its proper phase relation, the variation of control being obtained by the adjustment of the resistance 28 of the first stage.

Let it be assumed that the power reactor is designed to deliver a desired maximum voltage to the load circuit when the current in the control winding is at its minimum and that it is desired to reduce the load voltage by the three stage control to a minimum. Then the direction of the turns of the control winding 38 should be such that it biases the flux of the core at a lower value than that due to the load windings by the opposing effect of the control winding. This condition would also apply to the direction of turns of the control winding 31 of the second stage. In order to secure the minimum voltage on the load circuit 2, the curent in the control winding 38 of the main reactor should have its desired maximum value in order that the reactance of the load windings 4, 4a should be a maximum and thereby deliver the minimum voltage to the load. In order that the control winding of the final stage should have this desired maximum current value, the reactor output of the second stage should be a maximum and this is obtained by the current in the control winding 31 of the second stage being of a minimum value so as to have the least bucking effect and permit the second stage reactor to have its full output. It follows that in order to supply this minimum current to the control winding 31 of the second stage, the output of the first stage must be a minimum. This is obtained by the adjustment of the contact of the resistance 28 of the first stage to secure sufficient bucking effect by its control winding 22 to cause the output of the first stage to be at its minimum value. When the contact of resistance 28 is moved to increase the output of the first stage, the voltage of the load circuit 2 will be increased gradually and raised to its maximum value when the output of the first stage is a maximum. At that time the output of the second stage is at its minimum.

It is thus apparent that in each succeeding stage of control, the output of each stage is opposite to that of the next stage, in that when the output of one is a maximum the output of the next stage is a minimum and so on. It is obvious that any desired number of stages may be coupled in cascaded relation as may be required for effectively controlling large amounts of power by the variation of an initial controlling current which can be very small even at its maximum value.

Fig. 10 includes the three stages of control similar to Fig. 9 except that between the second stage and the third stage is interposed another controlling reactor for the purpose of shifting the phase of the current applied to the controlling coil of the last stage represented by the power reactor 3. This interposed reactor is represented as having a core 39, a control winding 40 and windings 41 and 41a on the outside legs of the core. The windings 41 and 41a are supplied with power derived from the source 1 through a transformer having a primary 43 connected across the source and having a secondary winding 43a. One terminal of this secondary winding is connected to the terminals of the windings 41, 41a, the remaining terminals of which are connected to the reversed rectifiers 42, 42a, from which a lead 46 extends to one terminal of the control winding 38 which has its remaining terminal connected to a mid-tap of the secondary 43a. The remaining terminal of the secondary is connected to a terminal of a non-inductive resistance 44 having its other terminal connected to a point 47 in the lead 46. An adjustable contact 45 is movable along the contacts of the resistance 44 and is connected to one terminal of the resistance. The output of the second stage of control is delivered to the control winding 40 of the interposed reactor and the connection of this control winding to the other side of the source 1 completes the circuit of the power derived from the second stage.

In operation the first stage of Fig. 10 serves the same function as the first stage of Fig. 9, as already described, the current in the control coil thereof serving to lower or raise the magnetization of the core by its biasing effect, giving a wide range of controlling current to the control wind-winding 31 of the second stage. This current of winding 31 may be arranged to buck or aid the magnetization of core 32, according to the direction of the turns of winding 31, but not both, as only the amplitude of the current therein is changed by the control derived from the first stage. This results in giving a wide range of current control in the winding 40 and in the output of the rectifiers 42, 42a to the control winding 38 of the main reactor. When the contact 45 of resistance 44 is at one extreme position the phase of the current delivered to the control winding 38 of the power reactor will be such as to cause its flux to aid the flux in the core of this reactor and thereby raise the voltage applied to the load circuit from an intermediate value to a maximum value. This maximum value will be attained when the adjustable contact of the resistance 28 of the first stage is in a position to cause the second stage to deliver a maximum value of current to the control winding 40, it being assumed that the direction of turns of winding 40 are such as to raise the magnetization of the core 39. The voltage of the load circuit may be decreased either by shifting the phase contact 45 so as to lessen the aiding flux effect of the control winding 38, or by shifting the contact of the resistance 28 so as to reduce the value of the current delivered to the control winding 38, or by utilizing both of these adjustments to a sufficient extent to obtain the desired voltage on the load circuit. By proper adjustment of these contacts the phase of the current in the control winding will have no appreciable effect on the power reactor and in that case the voltage of the load circuit will be of an intermediate value determined by the design of the power reactor. The voltage of the load circuit may now be reduced below this intermediate value by shifting the phase contact 45 so as to cause the flux due to the control winding 38 to bias the iron of the core 3 to a lower value than that due to the load windings 4 and 4a; and by adjustment of the phase contact 45 and adjustment of the contact of the adjustable resistance 28, a minimum voltage will be applied to the load circuit. It is obvious that by proper adjustment of the phase contact 45 and of the controlling resistance 28, any desired value of voltage may be applied to the load circuit over an extremely wide range from a very low value to a high value. Moreover the amount of power controlled in the load circuit may be very great as compared with the values of the controlling current in the several stages.

In some of the foregoing figures a capacitive device has been shown connected in series with an adjustable non-inductive resistive device for securing a shifting of the phase of the controlling current through a range approaching 180°. This change of phase of the controlling current may be accomplished by various forms of apparatus. Fig. 11 shows another form of means for securing this phase shift of the controlling current. It is similar to that described with reference to the form shown in Fig. 8 and in the first stages of Figs. 9 and 10 except that the capacitive device is replaced by an inductive device 47, the other parts designated by the numerals 14, 14a, 19 and 19a corresponding to the primary and secondary windings of the transformer and to the adjustable resistance previously described. In Fig. 11 the shifting of the contact 19a will cause the phase of the controlling current to be shifted through nearly 180° in order to secure an aiding or bucking effect of the control winding of the reactor.

In practicing this invention the electric valves or rectifiers may be of any type such, for example, as the copper oxide type for the purpose of economy. Low voltage rectifiers may be used and when of the copper oxide type it is possible to use only one disk unit in series in the circuit and to obtain increase in current capacity by connecting them in parallel.

Although the reactor cores have been shown of the three-legged form in the drawings, they may be varied to suit particular requirements and the preference of the designer. Fig. 12 shows the core made up of two parts 48, 48a and the part 48 carries a load winding 49 while the part 48a carries a load winding 49a. The control winding 50 envelops both adjoining parts of the two cores. This structure is the equivalent of the three-legged form being the same except the core is divided along a middle line of the central leg. Fig. 13 is the same as Fig. 12 except the control winding is divided in two parts 51 and 51a connected in series with each other in such relation as regards direction of turns to the direction of turns of the load windings as to give the desired effect in the manner already explained. Fig. 14 shows another form wherein the core 52 is made of the four-legged type. One of the load windings 53 enclosed one of the inside legs and the other load winding 53a encloses the other inside leg. The control winding 54 envelops both inside legs.

The operation with the cores of the character shown in Figs. 12, 13 and 14 is similar to that previously described with reference to the other drawings, the control winding being supplied with an alternating current and the load windings being subjected to intermittent currents from the source. In Figs. 12, 13 and 14 the full line arrows represent the direction and main path of the flux due to one of the load windings while the dotted line arrows represent that due to the other load winding. The alternating current in the control winding will bias the iron to raise or lower the magnetization during the inactive periods of the load windings, as already explained.

Although certain embodiments of this invention have been described, it will be understood that various other modifications and applications thereof may be made. Although the invention has been described as applying to the use of a single-phase system, the invention may be applied to a polyphase system in a manner which may be understood by those skilled in the art. Also the controlling parts may be subjected to automatic control for use in various systems for securing particular results according to special requirements.

I claim:

1. The combination of an alternating current source, reactive means having windings receiving current from said source, said windings having cores, an electric valve in series with each of said windings respectively and connected to deliver an alternating current to a consumption circuit, a control winding connected to said source and receiving an alternating current from said source for raising the magnetization of the cores of said windings during their inactive periods respectively, the voltage of the alternating current applied to the control winding aiding the voltage induced therein by the flux due to said windings.

2. The combination of an alternating current source, reactive means having windings receiving current from said source, said windings having cores, an electric valve in series with each of said windings respectively and connected to deliver an alternating current to a consumption circuit, a control winding connected to said source and receiving an alternating current from said source for raising the magnetization of the cores of said winding during their inactive periods respectively, and means for changing the value of the current supplied to said control winding, the voltage of the alternating current applied to the control winding aiding the voltage induced therein by the flux due to said windings.

3. The combination of an alternating current source, reactive means having windings receiving current from said source, said windings having cores, an electric valve in series with each of said windings respectively and connected to deliver an alternating current to a consumption circuit, a control winding connected to said source and receiving an alternating current from said source for raising the magnetization of the cores of said windings during their inactive periods respectively, and means for changing the phase of the current supplied to said control winding, the voltage of the alternating current applied to the control winding aiding the voltage induced therein by the flux due to said windings.

4. The combination of an alternating current source, reactive means having windings receiving current from said source, said windings having cores, an electric valve in series with each of said windings respectively and connected to deliver an alternating current to a consumption circuit, a control winding, means for supplying an alternating current to said control winding for affecting the flux of the cores of said windings during their inactive periods respectively, and means for shifting the phase of said last named current to raise or lower the magnetization of said cores, the voltage of the alternating current applied to the control winding aiding or opposing the voltage induced therein by the flux due to said windings.

5. A reactor having windings alternatively subjected to intermittent currents, said windings having cores, a control winding on the reactor subjected to an alternating current for affecting the magnetization of the cores of said windings during their inactive periods respectively, and means for shifting the phase of the current in said control winding for varying the effect of its flux on said cores, the voltage of the alternating current applied to the control winding aiding or opposing the voltage induced therein by the flux due to said windings.

6. A reactor having windings alternatively subjected to intermittent currents, said windings having cores, a control winding on the reactor subjected to an alternating current for affecting the magnetization of the cores of said windings during their inactive periods respectively, and means for shifting the phase of the current in said control winding for raising or lowering the magnetization of said cores, the voltage of the alternating current applied to the control winding aiding or opposing the voltage induced therein by the flux due to said windings.

7. The combination of an alternating current source, a plurality of reactors, each of said reactors having windings receiving current from said source, said windings having cores, an electric valve in series with each of said windings respectively and connected to deliver an alternating current to the output circuit of each of said reactors, a control winding on each of said reactors respectively for affecting the magnetization of the cores of said windings during their inactive periods respectively, and means for supplying alternating current energy derived from the output of one reactor and from said source to the control winding of another reactor, the voltage of the alternating current applied to said last named control winding aiding or opposing the voltage induced therein by the flux due to said first named windings on its reactor.

8. The combination of an alternating current source, a plurality of reactors, each of said reactors having windings receiving current from said source, said windings having cores, an electric valve in series with each of said windings respectively and connected to deliver an alternating current to the output circuit of each of said reactors, a control winding on each of said reactors respectively for affecting the magnetization of the cores of said windings during their inactive periods respectively, means for supplying alternating current energy derived from the output of one reactor and from said source to the control winding of another reactor, the voltage of the alternating current applied to said last named control winding aiding or opposing the voltage induced therein by the flux due to said first named windings on its reactor, and means for shifting the phase of the current supplied to the control winding of at least one of said reactors.

9. The combination of an alternating current source, a plurality of reactors, each of said reactors having windings receiving current from said source, said windings having cores, an electric valve in series with each of said windings respectively and connected to deliver an alternating current to the output circuit of each of said reactors, a control winding on each of said reactors respectively for affecting the magnetization of the cores of said windings during their inactive periods respectively, means for supplying alternating current energy derived from the output of one reactor and from said source to the control winding of another reactor, the voltage of the alternating current applied to said last named control winding aiding or opposing the voltage induced therein by the flux due to said first named windings on its reactor, and means for adjusting the value of the current supplied to the control winding of at least one of said reactors.

10. The combination of an alternating current source, a plurality of reactors, each of said reactors having windings receiving current from said source, said windings having cores, an electric valve in series with each of said windings respectively and connected to deliver an alternating current to the output circuit of each of said reactors, a control winding on each of said reactors respectively for affecting the magnetization of the cores of said windings during their inactive periods respectively, means for supplying alternating current energy derived from the output of one reactor and from said source to the control winding of another reactor, the voltage of the alternating current applied to said last named control winding aiding or opposing the voltage induced therein by the flux due to said first named windings on its reactor, and means for adjusting the value of the current supplied to the control winding of at least one of said reactors and for shifting the phase of the current supplied to the control winding of at least one of said reactors.

FRANK G. LOGAN.